(12) United States Patent
Jeon et al.

(10) Patent No.: US 8,379,612 B2
(45) Date of Patent: Feb. 19, 2013

(54) METHOD AND DEVICE FOR TRANSMITTING AND RECEIVING DATA IN WIRELESS NETWORK

(75) Inventors: Beom Jin Jeon, Gyeonggi-do (KR); Joong Heon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 394 days.

(21) Appl. No.: 12/728,496

(22) Filed: Mar. 22, 2010

(65) Prior Publication Data

US 2010/0309845 A1    Dec. 9, 2010

Related U.S. Application Data

(60) Provisional application No. 61/185,207, filed on Jun. 9, 2009.

(30) Foreign Application Priority Data

Oct. 15, 2009    (KR) .................. 10-2009-0098260

(51) Int. Cl.
*H04W 72/00*    (2009.01)
(52) U.S. Cl. .................. 370/338; 370/348; 370/462

(58) Field of Classification Search .................. None
See application file for complete search history.

(56) References Cited

U.S. PATENT DOCUMENTS

| | | | |
|---|---|---|---|
| 8,102,835 B2* | 1/2012 | Shao et al. | 370/349 |
| 2007/0081490 A1* | 4/2007 | Kim et al. | 370/329 |
| 2007/0253391 A1 | 11/2007 | Shao et al. | |
| 2007/0286140 A1 | 12/2007 | Kwon | |

FOREIGN PATENT DOCUMENTS

| | | |
|---|---|---|
| WO | 2007/142481 | 12/2007 |
| WO | 2008/026868 | 3/2008 |
| WO | 2008/066363 | 6/2008 |
| WO | 2008/126958 | 10/2008 |

\* cited by examiner

*Primary Examiner* — Kwang B Yao
*Assistant Examiner* — Alex Skripnikov
(74) *Attorney, Agent, or Firm* — Lee, Hong, Degerman, Kang & Waimey

(57) ABSTRACT

A method for transmitting data in a transmitting device of a wireless network comprises transmitting one or more data packets to a receiving device via a reserved region comprising channel resources allocated by a coordinator, and transmitting channel time extension information for requesting channel time extension to the receiving device, in order to transmit the data packets on an unreserved region in which the coordinator does not allocate channel resources to any devices.

11 Claims, 17 Drawing Sheets

METHOD AND DEVICE FOR TRANSMITTING AND RECEIVING DATA IN WIRELESS NETWORK

This application claims the benefit of U.S. provisional application 61/185,207 filed on Jun. 9, 2009, which is hereby incorporated by reference as if fully set forth herein. This application claims the benefit of the Korean Patent Application No. 10-2009-0098260, filed on Oct. 15, 2009, which is hereby incorporated by reference as if fully set forth herein.

DESCRIPTION

1. Technical Field

The present invention relates to a wireless network, and more particularly, to a method for transmitting and receiving data between devices belonging to a wireless network, and the devices.

2. Background Art

Recently, a Bluetooth or Wireless Personal Area Network (WPAN) technology for establishing a wireless network between a relatively small number of digital devices in a restricted space such as home or small-size office so as to exchange audio or video data has been developed. The WPAN may be used to exchange information between a relatively small number of digital devices within a relatively close distance so as to achieve low power consumption and low-cost communication between the digital devices. The IEEE 802.15.3 approved on Jun. 12, 2003 defines Wireless Medium Access Control (MAC) and Physical Layer (PHY) Specifications for High Rate Wireless Personal Area Networks (WPANs). FIG. 1 is a view showing the configuration example of a WPAN. As shown in FIG. 1, the WPAN is a network established between personal devices in a restricted space such as a home, and the devices may directly communicate with each other so as to establish the network and exchange information without interruption between applications. Referring to FIG. 1, the WPAN is composed of two or more user devices 11 to 15 and one of the devices operates as a coordinator 11. The coordinator 11 serves to provide basic timing of the WPAN and to control Quality of Service (QoS) requirements. Examples of the devices include all digital devices such as a computer, a Personal Digital Assistant (PDA), a notebook type computer, a digital television set, a camcorder, a digital camera, a printer, a microphone, a speaker, a headset, a barcode reader, a display, and a mobile phone. The WPAN is an ad hoc network (hereinafter, referred to as "piconet") which is not designed and established in advance, but is established if necessary without the help of a central infrastructure. A process of establishing one piconet will now be described in detail. The piconet is started when a certain device, which may operate as a coordinator, performs the function of a coordinator. All the devices perform scanning before a new piconet is started or before being associated with the existing piconet. The scanning refers to a process of, at a device, collecting and storing information about channels and determining whether the existing piconet is present. A device which receives an instruction for starting a piconet from an upper layer establishes a new piconet without being associated with a piconet which is previously established. The device selects a channel with less interference based on data acquired by the scanning process and broadcasts a beacon via the selected channel, thereby starting the piconet. The beacon is control information which is broadcast by the coordinator in order to control and manage information associated with the piconet, such as timing allocation information and information about the other devices within the piconet.

FIG. 2 shows an example of a superframe used in a piconet. The timing control of the piconet is basically performed based on the superframe.

Referring to FIG. 2, each superframe is started by a beacon transmitted from a coordinator. A Contention Access Period (CAP) is used for devices to transmit commands or asynchronous data using a contention-based method. A channel time allocation period may include Management Channel Time Blocks (MCTBs) and Channel Time Blocks (CTBs). The MCTB is a period in which control information may be transmitted between a coordinator and a device or between a device and a device, and the CTB is a period in which asynchronous or isochronous data may be transmitted between a device and a coordinator or between different devices. In each superframe, the numbers, the lengths and the locations of CAPs, MCTBs and CTBs are determined by the coordinator and are transmitted to other devices within the piconet via a beacon. When a certain device within a piconet needs to transmit data to a coordinator or another device, the device makes a request for channel resources used for data transmission to the coordinator, and the coordinator allocates the channel resources to the device within an available channel resource range.

If a CAP is present within a superframe and the coordinator accepts data transmission in the CAP, the device may transmit a small amount of data via the CAP in a state in which the coordinator does not allocate a channel time. If the number of devices within the piconet is small, channel resources used for enabling the devices to transmit data are sufficient and thus no problem occurs in channel resource allocation. However, if the number of devices is large and thus channel resources are insufficient or if the number of devices is small but a specific device continuously occupies a channel in order to transmit large amounts of data such as a moving image, the channel resources may not be allocated to the other devices even when the other devices have data to be transmitted. Thus, communication may be impossible. In addition, although the channel resource is allocated, the amount of the channel resources may be less than the amount of stored data.

Accordingly, research into a method of smoothly perform bidirectional communication between devices is ongoing. On a Wireless Video Area Network (WVAN), a coordinator should allocate a predetermined amount of channel resources to a device in order to transmit data to another device. A device which accepts channel resources allocated by a coordinator may specify and use some of the channel resources. If the channel resources are temporally divided, a period in which a specific device accepts and uses channel resources allocated by a coordinator is called a reserved region.

In general, a transmitting device transmitting device specifies and requests a necessary amount of channel resources based on the amount of data to be transmitted when making a request for channel resource allocation to a coordinator. However, in an actual data transmission process, data loss or data error may occur. In this case, an expected transmission amount is not satisfied when data is transmitted via a reserved region, the remaining data is transmitted via a next reserved region. Thus, a data transmission time is delayed. In addition, when a receiving device reproduces the received data, the number of time of buffering or a reproduction time may be increased.

In addition, if the transmitting device transmitting device does not complete data transmission within the channel resources allocated by the coordinator and makes an additional request for channel resource allocation to the coordinator, an unnecessary process of scheduling channel resource again or setting up channel resources is added.

DISCLOSURE

[Technical Problem]

Accordingly, the present invention is directed to a method and device for transmitting and receiving data in a wireless network that substantially obviate one or more problems due to limitations and disadvantages of the related art. An object of the present invention is to provide a method of efficiently allocating channel resources to devices in a wireless network, and, more particularly, a method of utilizing an unreserved region as a reserved region such that the unreserved region which has been used by a certain device is made available to a specific device according to a contention-based method between devices.

Another object of the present invention is that a Station may extend transmissions past the current assigned CTB (Channel Time Block) into following unreserved channel time without any intervention of the Coordinator so that the Station may use that extra time for retransmission, beam searching, bidirectional data transfer, etc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

[Technical Solution]

To achieve these objects and other advantages and in accordance with the purpose of the invention, as embodied and broadly described herein, a method for transmitting data in a transmitting device of a wireless network comprises transmitting at least one data packet to a receiving device during a reserved channel time allocated by a coordinator and transmitting information for channel time extension to the receiving device to transmit a data packet during an unreserved channel time.

The unreserved channel time is a channel time which is not allocated to any devices by the coordinator. And, the reserved or unreserved channel time comprises at least one channel time block.

According to the embodiment of the present invention, the information for channel time extension is transmitted to the data receiving device when transmission of the at least one data packet is incomplete during the reserved channel time.

In another aspect of the present invention, a transmitting device for transmitting data in a wireless network configured to transmit at least one data packet to a receiving device during a reserved channel time allocated by a coordinator and transmit information for channel time extension to the receiving device to transmit a data packet during an unreserved channel time.

According to the embodiment of the present invention, the unreserved channel time is a channel time which is not allocated to any devices by the coordinator.

According to the embodiment of the present invention, the reserved or unreserved channel time comprises at least one channel time block. And, the information for channel time extension is included in a last data packet of the at least one data packet transmitted during the reserved channel time.

In another aspect of the present invention, a method of receiving data in a receiving device of a wireless network comprises receiving at least one data packet from a transmitting device during a reserved channel time allocated by a coordinator, receiving information for channel time extension (CTE) from the transmitting device and receiving a data packet from the transmitting device during the unreserved channel time after receiving the information to CTE.

According to the embodiment of the present invention, the unreserved channel time is a channel time which is not allocated to any devices by the coordinator.

According to the embodiment of the present invention, the reserved or unreserved channel time comprises at least one channel time block. And, the information for channel time extension is received from the transmitting device when reception of the at least one data packet is incomplete during the reserved channel time.

According to the embodiment of the present invention, the data packet is received without any intervention of the coordinator.

Furthermore, the information for channel time extension is included in a last data packet of the at least one data packet received during the reserved channel time.

In another aspect of the present invention, a receiving device for receiving data in a wireless data means for receiving at least one data packet from a transmitting device during a reserved channel time allocated by a coordinator and receiving information for channel time extension (CTE) from the transmitting device and receiving a data packet from the transmitting device during the unreserved channel time after receiving the information to CTE.

[Advantageous Effects]

According to one embodiment of the present invention, it is possible to efficiently use channel resources allocated by the coordinator, by using a portion of the unreserved region of the channel resources as a reserved region when data is transmitted or received between devices in a Wireless Video Area Network (WVAN). According to one embodiment of the present invention, if the transmission device which will transmit data does not satisfy an expected amount of data transmitted via the reserved region of the channel resources allocated by the coordinator, the remaining data is transmitted via the unreserved region subsequent to the reserved region, thereby reducing a data transmission delay time.

In addition, a buffering time consumed for reproducing the data by the reception device which receives the data can be shortened.

According to one embodiment of the present invention, the transmission device can perform a process such as a data transmission process or a beam searching process via the unreserved region without making a request for separate channel resource allocation to the coordinator so as to schedule or set up the channel resources again.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Additional advantages, objects, and features of the invention will be more readily apparent from consideration of the following detailed description relating to the accompanying drawings.

The following embodiments are examples in which the technical features of the present invention are applied to a Wireless Video Area Network (WVAN) which is one type of Wireless Personal Area Network (WPAN).

Figure 3:
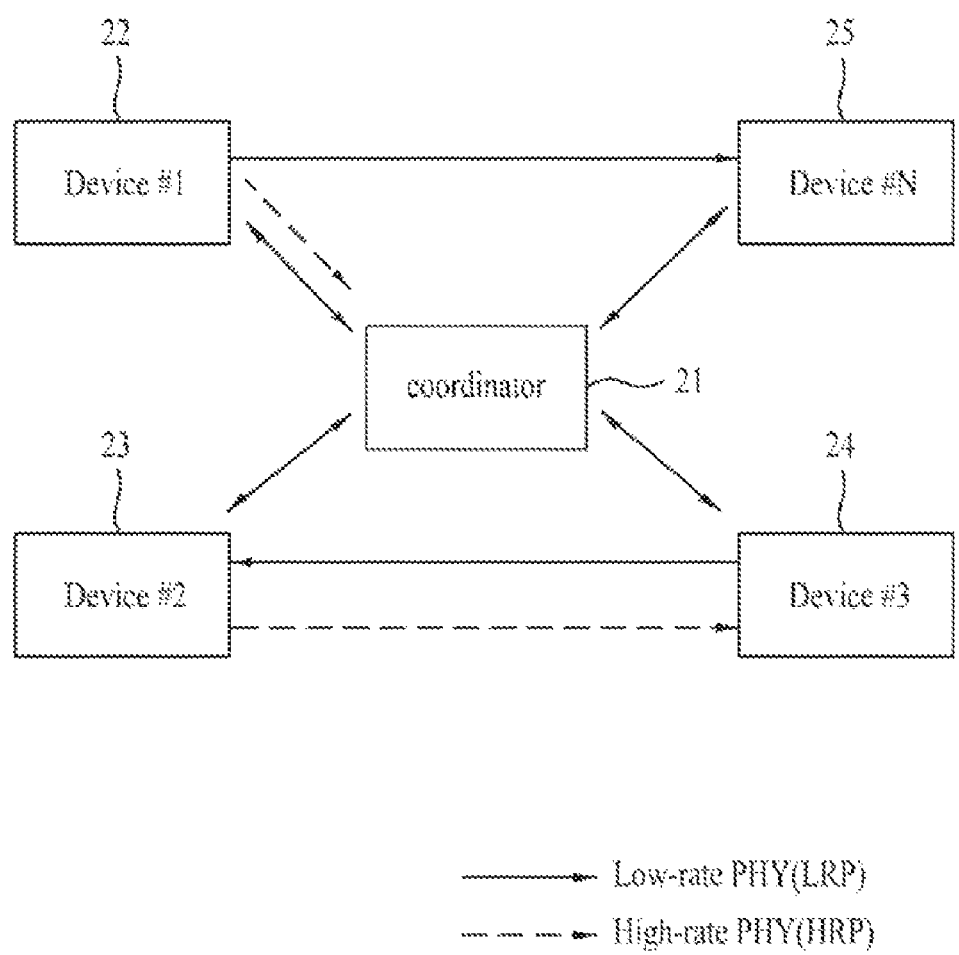
FIG. 3 is a view showing an example of the configuration of a Wireless Video Area Network (WVAN)

FIG. 3 is a view showing an example of the configuration of a WVAN.

Figure 1:
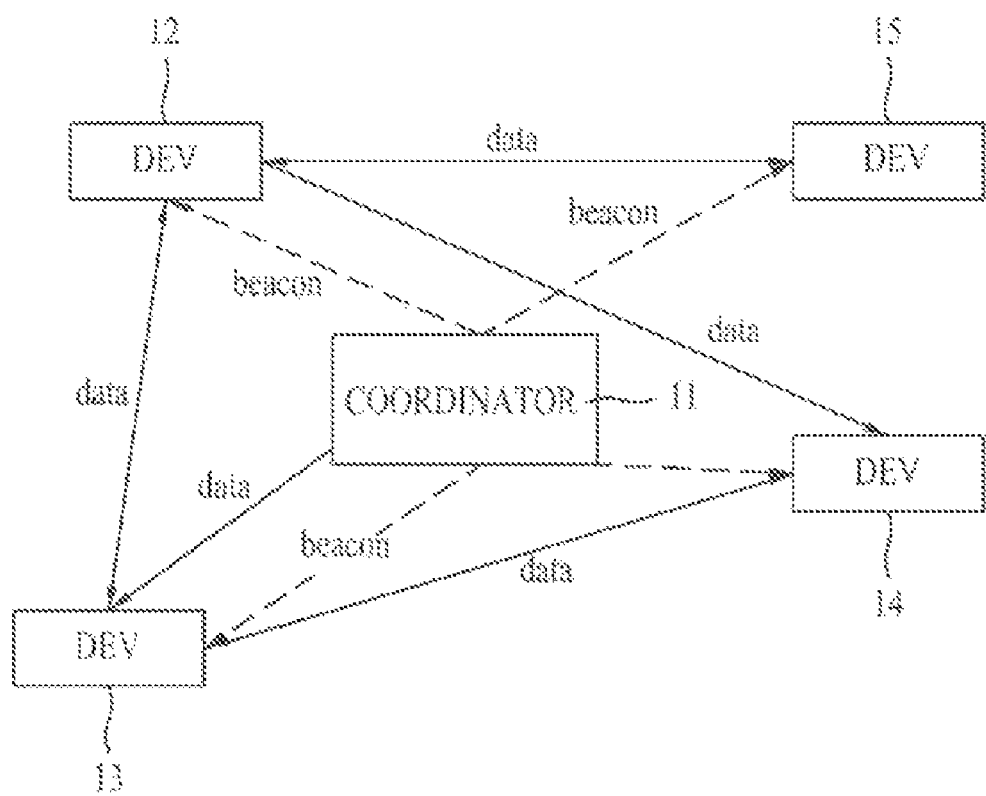
FIG. 1 is a view showing the configuration example of a Wireless Personal Area Network (WPAN)
Figure 2:
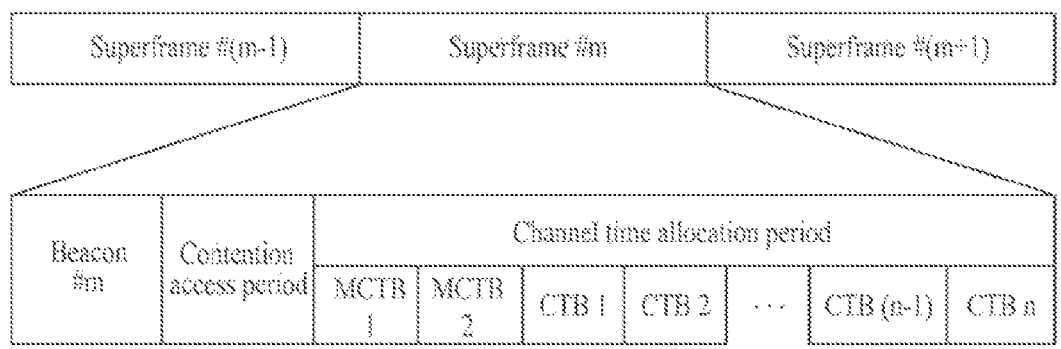
FIG. 2 is a view showing an example of a superframe used in a piconet.

Like the WPAN shown in FIG. 1, the WVAN includes two or more user devices 22 to 25, and one device operates as a coordinator 21. The coordinator 21 serves to provide basic timing of the WVAN, to hold the tracks of the devices belonging to the WVAN, and to control Quality of Service (QoS) requirements. Since the coordinator is also the device, the coordinator performs the function of one device belonging to the WVAN as well as the function of the coordinator. The other devices 22 to 25 excluding the coordinator 21 may initiate stream connection.

The WVAN shown in FIG. 3 is different from the WPAN of FIG. 1 in that two types of Physical (PHY) layers are supported. That is, the WVAN supports a high-rate physical (HRP) layer and a low-rate Physical (LRP) layer. The HRP layer is a physical layer which can support a data transfer rate of 1 Gb/s or more and the LRP layer is a physical layer which supports a data transfer rate of several Mb/s. The HRP layer is highly directional and is used to transmit isochronous data streams, asynchronous data, Media Access Control (MAC) command and Audio/Video (A/V) control data through unicast connection. The LRP layer supports a directional or omni-directional mode, and is used to transmit a beacon, asynchronous data, and MAC command through unicast or broadcast. The coordinator 21 may transmit data to another device or receive data from another device using the HRP layer and/or the LRP layer.

The other devices 22 to 25 of the WVAN may transmit or receive data using the HRP layer and/or the LRP layer.

Figure 4:
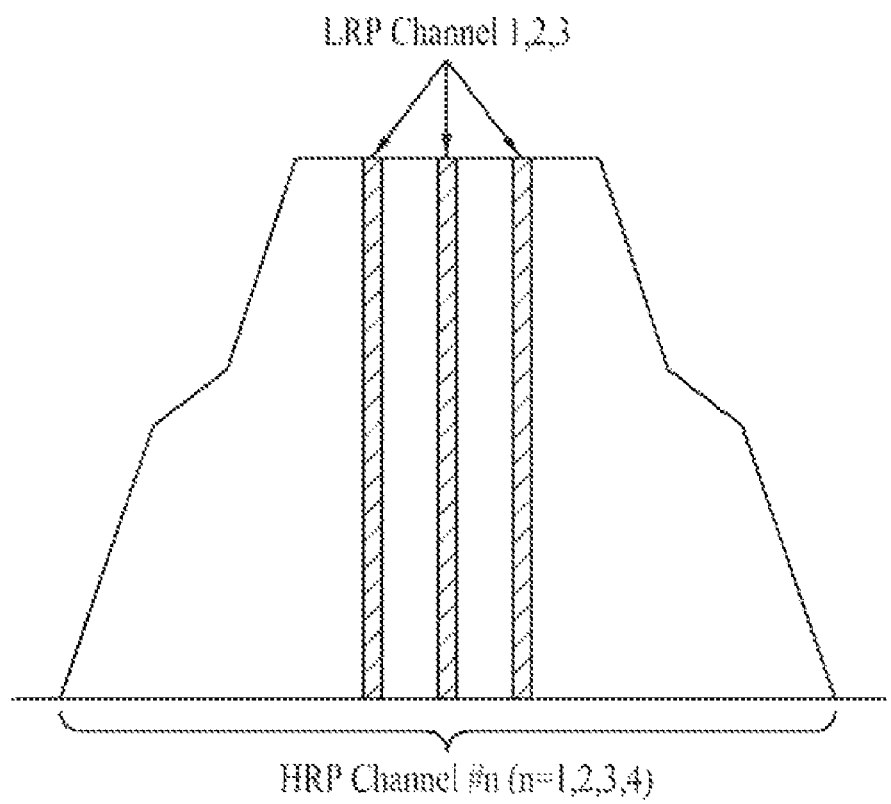
FIG. 4 is a view explaining the frequency band of high-rate physical (HRP) layer channels and low-rate physical (LRP) layer channels used in a WVAN.

FIG. 4 is a view explaining the frequency band of HRP channels and LRP channels used in a WVAN.

The HRP layer uses four channels having a bandwidth of 2.0 GHz in a band of 57 to 66 GHz, and the LRP layer uses three channels having a bandwidth of 92 MHz. As shown in FIG. 4, the HRP channels and the LRP channels share the frequency band and the frequency band is divided and used according to a Time Division Multiplexing Access (TDMA) scheme.

Figure 5:
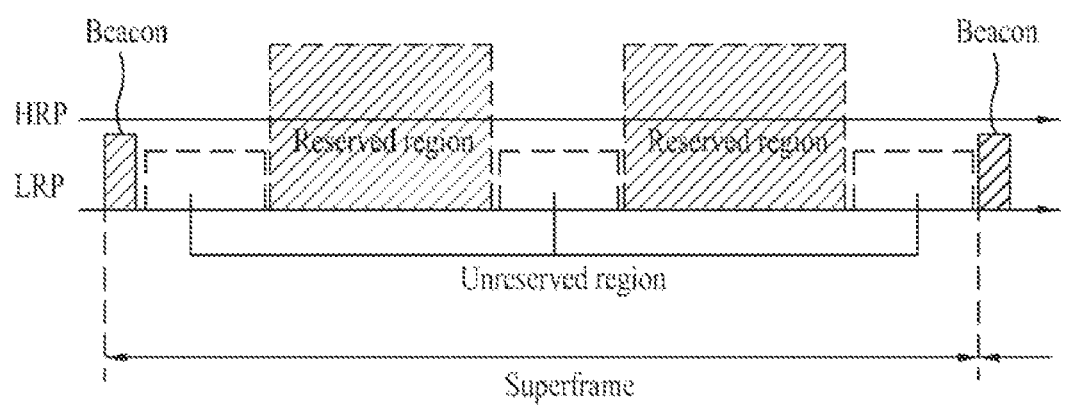
FIG. 5 is a view showing an example of a superframe structure used in a WVAN.

FIG. 5 is a view showing an example of a superframe structure used in a WVAN.

Referring to FIG. 5, each superframe includes a beacon region in which a beacon is transmitted, a reserved region allocated to a certain device by a coordinator according to the requests of devices, and a unreserved region in which data is transmitted or received between a coordinator and a device or between a device and a device according to a contention-based method. These regions are temporally divided. The beacon includes timing allocation information and WVAN management and control information of the superframe. The reserved region is used to enable a device, which accepts channel time allocated by the coordinator according to a channel time allocation request of the device, to transmit data to another device.

Commands, data streams or asynchronous data may be transmitted via the reserved region. If a specific device transmits data to another device via the reserved region, an HRP channel is used and, if a device which receives data transmits an Acknowledgement (ACK)/Negative ACK (NACK) signal for the received data, an LRP channel is used. The unreserved region may be used to transmit control information, MAC commands or asynchronous data between a coordinator and a device or between a device and a device. In order to prevent data collision between devices in the unreserved region, a Carrier Sense Multiple Access (CSMA) scheme or a slotted Aloha scheme may be applied. In the unreserved region, data may be transmitted via only an LRP channel.

Figure 6:
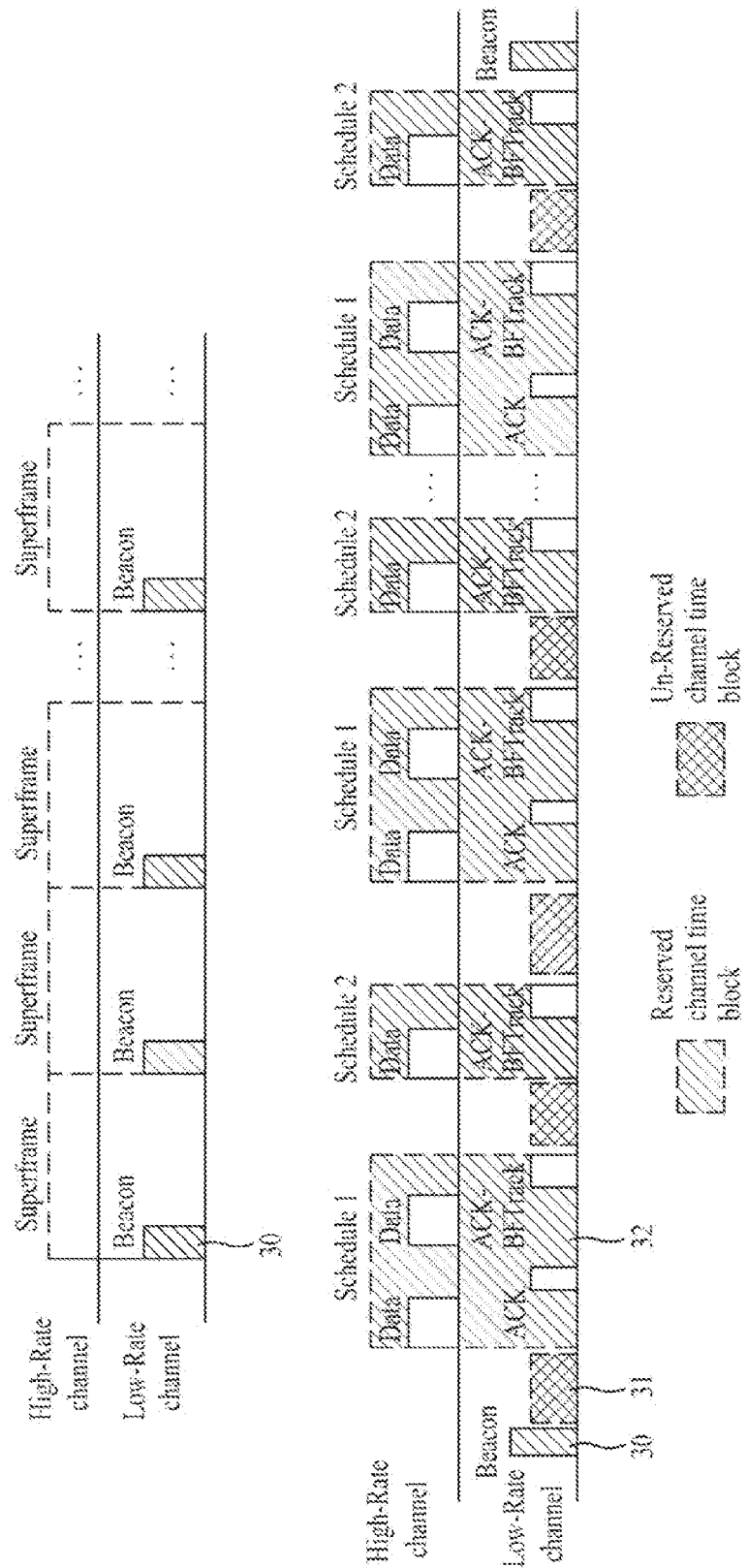
FIG. 6 is a view explaining another example of the superframe structure used in a WVAN.

If the amount of control information or commands to be transmitted is large, a reserved region may be set in the LRP channel. The lengths and the numbers of the reserved regions and the unreserved regions in each superframe may be different according to superframes and are controlled by the coordinator. FIG. 6 is a view explaining another example of the superframe structure used in a WVAN. Referring to FIG. 6, each superframe includes a region 30 in which a beacon is transmitted, a reserved channel time block 32 and an unreserved channel time block 31. The channel time blocks (CTBs) are temporally divided into a region (HRP region) in which data is transmitted via an HRP layer and a region (LRP region) in which data is transmitted via an LRP layer.

The beacon 30 is periodically transmitted by the coordinator in order to identify an introduction portion of each superframe, and includes scheduled timing information, and WVAN management and control information. The device may perform data exchange in the network using the timing information and management/control information included in the beacon. In the HRP region, the reserved CTB region may be used to enable the device, which accepts the channel time allocated by the coordinator according to the channel time allocation request of the device, to transmit data to another device.

If a specific device transmits data to another device via the reserved CTB region, an HRP channel is used and, if a device which receives data transmits an ACK packet for the received data, an LRP channel is used. The unreserved CTB region may be used to transmit control information, MAC commands or asynchronous data between a coordinator and a device or between a device and a device. In order to prevent data collision between devices in the unreserved CTB region, a CSMA scheme or a slotted Aloha scheme may be applied.

In the unreserved CTB region, data may be transmitted via only an LRP channel. If the amount of control information or commands to be transmitted is large, a reserved region may be set in the LRP channel.

The lengths and the numbers of the reserved regions and the unreserved regions in each superframe may be different according to superframes and are controlled by the coordinator.

Although not shown in FIG. 6, the superframe includes a contention-based control period (CBCP) located next to the beacon, in order to transmit an urgent control/management message. The length of the CBCP is set so as not to be greater than a predetermined threshold mMAXCBCPLen.

Figure 7:
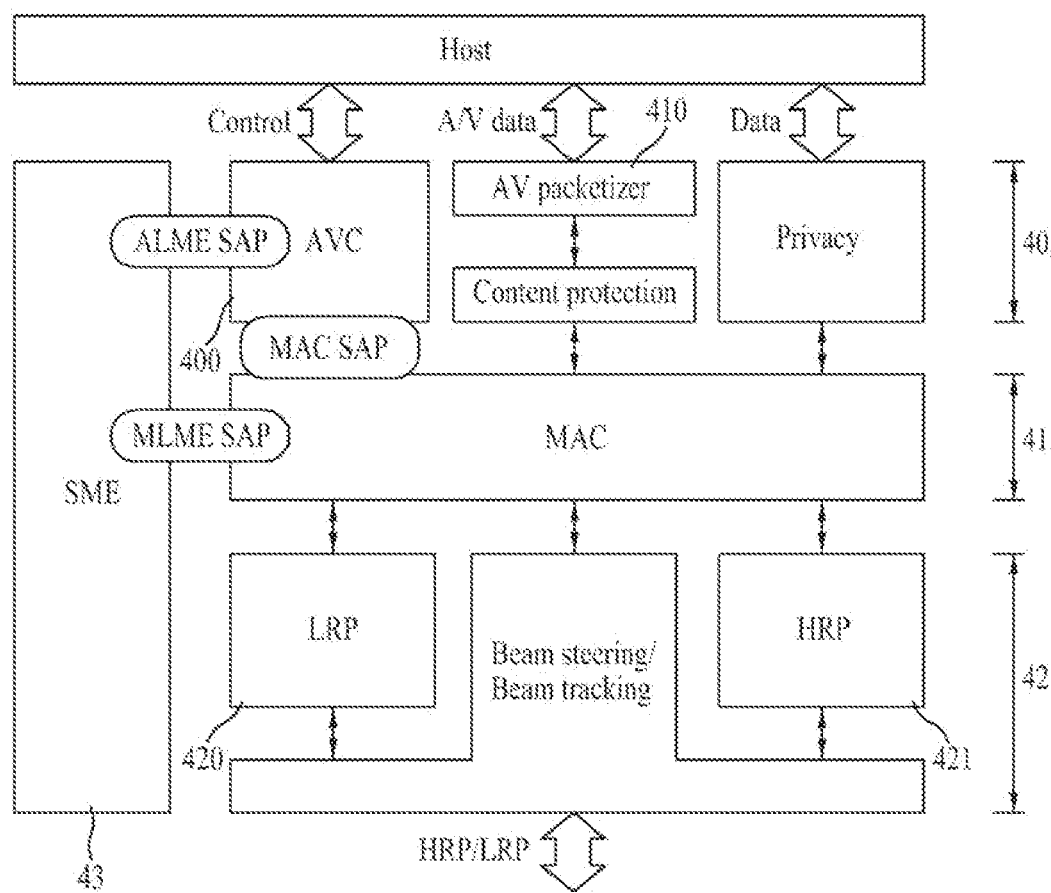
FIG. 7 is a view showing a protocol hierarchical structure implemented in a device of a WVAN.

FIG. 7 is a view showing a protocol hierarchical structure implemented in a device of a WVAN.

Referring to FIG. 7, a communication module of each of the devices included in the WVAN may be divided into four layers: an adaptation sublayer 40, a MAC layer 41, a PHY layer 42, and a Station Management Entity (SME) 43, according to functions. The station is a device which is distinguished from a coordinator, and the SME has the same meaning as a Device Management Entity (DME). The SME is a layer independent entity for controlling lower layers and collecting status information of the device from the layers. The SME includes an identity for managing each layer of a device communication module.

An entity for managing the MAC layer is called a MAC Layer Management Entity (MLME) and an entity for managing the adaptation layer is called an Adaptation Layer Management Entity (ALME). The adaptation sublayer 40 may include an AVC protocol and an A/V packetizer. The AVC protocol (Audio Video Layer) 400 is an upper layer which performs streaming connection and device control for A/V data transmission between a transmitting device and a receiving device. The A/V packetizer 410 formats A/V data for an HRP data service.

The MAC layer 41 is a lower layer of a material transmission protocol and performs link setup, connection or disconnection, channel access, and reliable data transmission. That is, the MAC layer transmits a control/data message or controls a channel. The PHY layer 42 may directly process A/V data or the MAC layer 41 may process the A/V data. The PHY layer switches a message requested by an upper layer such as the adaptation layer 40 or the MAC layer 41 in order to process a radio signal such that the request message is transmitted between devices by the PHY layer. The PHY layer includes two types of PHY layers including the HRP 420 and the LRP 421. The layer of the device provides a service such as a high-rate service, a low-rate service, and a management service. The high-rate service is used to transfer video, audio and data and the low-rate service is used to transfer audio data, MAC commands and a small amount of asynchronous data. A simple message is exchanged before a data exchange process is performed between layers, and a message exchanged between different layers is called a primitive.

In order to perform wireless communication between devices in a wireless network, a coordinator should allocate channel resources to a certain device. When the certain device transmits a channel allocation request for transmitting A/V data to another device, the coordinator performs a channel search operation for searching for a channel having a minimum interference rate.

If the channel resources are available, the channel resources having a predetermined range are allocated to the device which transmits the channel allocation request, and the device which accepts the channel resources allocated by the coordinator may transmit data to another device of the wireless network using the allocated channel resources.

Figure 8:
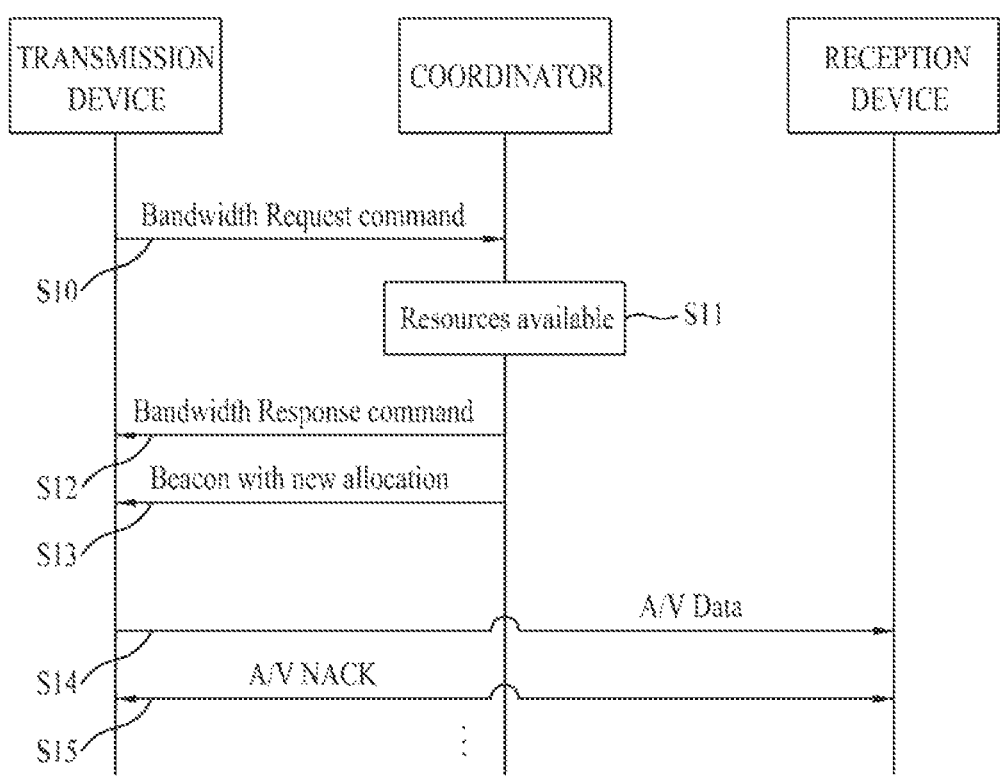
FIG. 8 is a flow diagram showing an example in which a transmitting device of a WVAN accepts channel resources allocated by a coordinator and transmits data to a receiving device.

FIG. 8 is a flow diagram showing an example in which a transmitting device of a WVAN accepts channel resources allocated by a coordinator and transmits data to a receiving device.

Referring to FIG. 8, the transmitting device transmits a channel resource request message (bandwidth request command) to the coordinator in order to obtain the channel resource for data packets transmission (S10). The coordinator which receives the channel resource request message determines whether there are available channel resources to be allocated to the transmitting device (S11). If it is determined that there are available channel resources, the coordinator transmits a response message (bandwidth response command) indicating that the requested channel resources are allocated to the transmitting device (S12).

The coordinator transmits information about the format or the range of the channel resources, which will be newly allocated, to the transmitting device on a beacon (S13). At this time, other devices including a receiving device belonging to the WVAN receive information indicating that the coordinator allocates a predetermined amount of channel resources to the transmitting device on the beacon broadcast by the coordinator.

The transmitting device which accepts the predetermined amount of channel resources from the coordinator transmits A/V packet to the receiving device on the allocated channel resources (S14). At this time, the A/V packet is transmitted on a reserved region within a superframe of the allocated channel resources and the other control information and asynchronous data packets are transmitted on an unreserved region.

The receiving device which receives the A/V data from the transmitting device transmits an ACK packet to the transmitting device (S15). The ACK signal is a signal which is transmitted from the receiving device to the transmitting device in order to indicate that the signal transmitted by the transmitting device is normally received. When the ACK signal is received, the transmitting device may transmit next data. In contrast, the NACK signal is a signal indicating that the receiving device cannot normally receive the signal transmitted from the transmitting device due to signal loss or error occurrence. When the NACK signal is received, the transmitting device should retransmit the data packets which is not normally received.

In general, the device may specify schedule types of channel resources allocated by the coordinator while requesting channel resource allocation to the coordinator and include the schedule types in the channel resource request message. The schedule types of the channel resources may be divided into a static schedule type and a dynamic schedule type according to the characteristics of a CTB included in the superframe. The static schedule type is used for continuous allocation of a superframe including one or more CTBs having the same size for transmission of data packets which should continue to be transmitted for a predetermined period of time, such as A/V data packets, and each superframe includes the same number of CTBs.

In contrast, the dynamic schedule type is used for temporary data transmission such as beam search, control message change or the like, and the number of CTBs included in each superframe is not limited because the sizes of the superframes may not be equal. In FIG. 8, the channel resource request command (bandwidth request command) is used to request allocation, change or end of the channel resources to the coordinator in order to perform a process associated with data transmission from the transmitting device to the coordinator or another device. The channel resource request command packets include regions indicating n channel resource request items (bandwidth request items), and one channel resource request item region may be configured in a data format shown in Table 1.

channel resources in order to transmit the isochronous data, and indicates the total number of channel resources included in one superframe if the device requests the channel resources in order to transmit the asynchronous data.

The Maximum number of time blocks field indicates the maximum number of channel resources which are requested to be allocated by the device, if the device requests the channel resources in order to transmit the isochronous data packets, and is reserved for transmission of another data packets in case of the asynchronous stream request. The Time Block Duration field indicates the duration of the plurality of channel resource blocks included in the schedule.

The Minimum schedule period field indicates the minimum value of a period from a time point when a first channel resource block is started to a time point when a second channel resource block is started, in the case where two channel resource blocks are consecutively allocated. The maximum schedule period field indicates the maximum value of a period from a time point when a first channel resource block is started to a time point when a second channel resource block is started, in the case where the device requests the channel resources for the isochronous data packets and two channel resource blocks are consecutively allocated.

In contrast, this field indicates a time when a first channel resource block allocated in the superframe is started, in the case where the device requests the channel resources for the asynchronous data packets. The Request Control field specifies the schedule types of the channel resources allocated by the coordinator and the type of the physical layer.

TABLE 1

| Octets: 1 | 1 | 1 | 1 | 1 | 2 | 2 | 2 | 1 |
|---|---|---|---|---|---|---|---|---|
| TrgtID | Stream request ID | Stream Index | Minimum number of time blocks | Maximum number of time blocks | Time Block Duration | Minimum schedule period | Maximum schedule period | Request Control |

Referring to Table 1, the channel resource request item region may include a TrgtID field indicating the ID of the device which requests the channel resource allocation, a Stream request ID field indicating the type of the request message of the device, a Stream Index field indicating a stream index allocated by the coordinator, a Minimum number of time blocks field indicating the minimum number of channel resources included in one superframe, a Maximum number of time blocks field indicating the maximum number of channel resources, a Time Block Duration field indicating the duration of each of the channel resources, a Minimum schedule period field indicating a minimum schedule period, a Maximum schedule period field indicating a maximum schedule period, and a Request Control field including request information of the channel resources. The Stream Index field indicates the stream index determined by the coordinator.

The coordinator allocates a unique stream index to each stream of the WVAN according to data to be transmitted by the device or traffic types. For example, if the device requests an isochronous stream, the Stream Index field is set to an unassigned stream index. If the device requests the reservation or end of the channel resources for an asynchronous stream, the Stream Index field is set to a value for transmitting the asynchronous stream.

The Minimum number of time blocks field indicates the minimum number of channel resources (e.g., channel time blocks) requested in one superframe if the device requests the For example, if 1 bit is used to indicate the schedule type, the static schedule type may be set to 1 and the dynamic schedule type may be set to 0.

The device may specify the types or allocation time of the channel resources to be allocated and request the channel resource allocation to the coordinator using the channel resource request command.

The coordinator which receives the channel resource request command may transmit the channel resource response command (bandwidth response command) after determining whether there are available channels to be allocated to the device. The channel resource response command includes n channel resource response items (bandwidth response items) as the response of the n channel resource request items included in the channel resource request command. The channel resource response item region may be configured in a data format shown in Table 2.

TABLE 2

| Octets: 1 | 1 | 1 |
|---|---|---|
| Stream Request ID | Stream Index | Reason Code |

Referring to Table 2, an example of the channel resource response item region indicates a stream request ID and a stream index specified in the channel resource request command received from the device. The channel resource response item region may include a Stream Request ID field, a Stream Index field and a Reason Code field. The Reason Code field specifies whether the coordinator can allocate the channel resources according to the request of the device and a code indicating the reason if the channel resource cannot be allocated. For example, the Reason Code field is set to 0x00 which indicates that the channel resource allocation is possible if the coordinator determines that there are available resources as the channel resource search result, and is set to 0x02 which indicates the reason that the channel resource allocation is impossible because handover is performed when the device requests additional channel resources.

If the coordinator allocates the channel resources having a predetermined range to the device, the allocation information of the new channel resources is transferred to the device on a beacon.

In general, the beacon is transmitted via an omni-directional Low-Rate Physical Data Unit (LRPDU) in a non-encrypted state, and the beacon includes scheduled timing information, management and control information of the WVAN. The beacon data packets include a MAC control header, a beacon control field, and a schedule IE field indicating n pieces of schedule information. In general, an Information Element (IE) data format is composed of fields including an IE index, the length of an IE signal, and information to be transferred.

The schedule IE indicates schedule time information in a next superframe. For example, the schedule IE included in an N-th beacon indicates the time information of a superframe which is started at an (N+1)-th beacon. The schedule IE includes n schedule blocks, and each schedule block includes the index information of a stream to which the schedule is allocated, a schedule period, the number of channel time blocks allocated to one schedule, time information of the start of a first channel time block of the schedule, and duration information of each channel time block.

The beacon control field is composed of a beacon status field, a superframe time information field for specifying time information of a transmission period between consecutive beacons, and a field indicating the number of superframes. The data packets of the beacon status field included in the beacon control field are configured as shown in Table 3.

TABLE 3

| Bits: 1 | 1 | 1 | 1 | 1 | 3 |
|---|---|---|---|---|---|
| Free channel time | Configuration change | Schedule change | Static schedule | Accepting commands | Reserved |

Referring to Table 3, an example of the beacon status field includes a Free channel time field indicating information about whether there are available channel resources according to the channel resource request, a Configuration change field indicating the configuration change of the channel resources specified in a current beacon excluding a field indicating the number of superframes, a Schedule change field indicating whether channel resource scheduling is changed on the current superframe by comparison with a previous beacon, a Static schedule field indicating whether a static schedule IE is included in the current beacon, an Accepting commands field indicating whether the channel resource allocation request is accepted, and a reserved field used for transmitting other data. In table 3, the Free channel time field may be set to 1 if the coordinator allocates the channel resources and may be set to 0 if it is determined that the new channel resources are not allocated.

The channel resource configuration change information field may be set to 0 if the configuration change is not performed. The static schedule field may not be included in all beacons in order to reduce overhead generated by the beacon, but the static schedule IE may be periodically included.

Similarly, if the static schedule IE is not included in the current beacon, the Static schedule field may be set to 0, and the Accepting commands field may be set to 0 if the coordinator rejects the channel allocation request of the device. The transmitting device to which the channel resources are allocated by the above-described process may establish a WVAN network with another device and transmit data packets to the receiving device via the allocated channel resources (S14). Similarly, the transmitting device receives the ACK packet for the data packets from the receiving device (S15).

In detail, the transmitting device transmits the data packets to the receiving device using the superframe structure shown in FIG. 5. An example of the superframe structure used by a WVAN device in steps S14 and S15 will be described with reference to FIG. 9.

Figure 9:
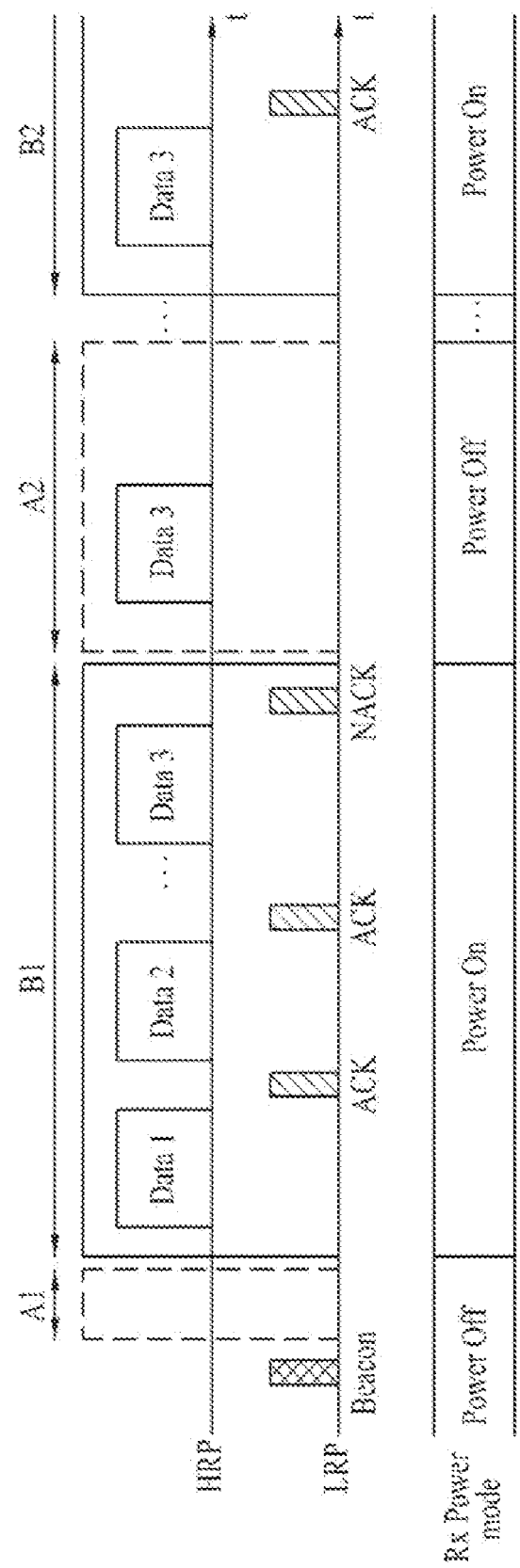
FIG. 9 is a view showing an example of a power mode of a receiving device according to the superframe structure used in a WVAN.

FIG. 9 is a view showing an example of a power mode of a receiving device according to the superframe structure used in a WVAN.

Referring to FIG. 9, one superframe is temporally divided into a region for transmitting a beacon, one or more reserved channel time $B_1, B_2, \ldots$ using the channel resources allocated by the coordinator, and one or more unreserved channel time $A_1, A_2, \ldots$ for transmitting and receiving a signal between devices without using the channel resources according to a contention-based method. The channel resources allocated by the coordinator may include one or more CTBs. As described above, when the transmitting device makes a request for the channel resources to the coordinator, the channel resources may be allocated.

The CTBs of the reserved channel time are available, the transmitting device transmits data packets to the receiving device on an HRP channel, and the receiving device transmits an ACK packet for the received data packets to the transmitting device on an LRP channel. The ACK packet may be transmitted on the HRP channel. At this time, in order to enable the receiving device to perform signal exchange with the transmitting device, the power mode of the receiving device is set to a normal mode which is a "Power On" state.

The reserved channel time can transmit and receive a control signal, data or the like between the devices according to the contention-based method, unlike the reserved channel time in which a specific device is specified and the channel resources are allocated. Since the receiving device receives information about a channel resource period allocated to the transmitting device and the reserved channel time/unreserved channel time on the beacon signal broadcast by the coordinator in advance, the power mode of the receiving device may be switched to a save mode which is a "Power Off" mode or a "Power Save" mode, from a time point when the unreserved channel time is started.

Hereinafter, for convenience of description, the power mode of the "Power On" state is indicated by the "normal mode" and the power mode of the "Power Off" or "Power Save" state is indicated by the "save mode".

Since the receiving device sets the power mode to the normal mode only in the reserved channel time, if the transmitting device does not complete the transmission of the data packets in the reserved channel time $B_1$, the transmission of the remaining data packets in the unreserved channel time $A_2$ located next to the reserved channel time $B_1$ is restricted.

If the transmitting device receives the NACK signal for the transmitted data packets from the receiving device and retransmits the data packets, a predetermined data transmission amount is not satisfied in a reserved channel time having a predetermined range.

In this case, since the transmitting device performs data transmission via a next reserved channel time $B_2$ but not on the unreserved channel time $A_2$, a transmission time is increased or a buffering time consumed for data reproduction is increased.

The embodiment of the present invention relates to a method for transmitting data packets using an unreserved channel time of a superframe in a WVAN device, which will be described with reference to FIG. 10.

Figure 10:
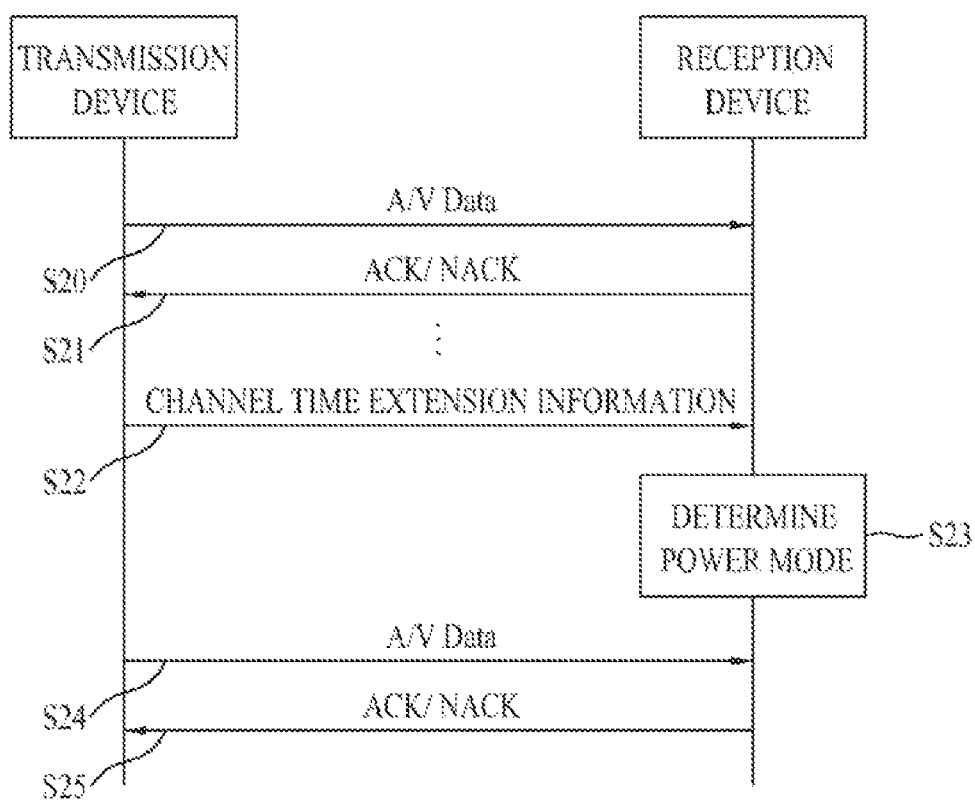
FIG. 10 is a flow diagram showing an example in which data is transmitted in a state of extending an allocated channel resource range in a WVAN according to an embodiment of the present invention.

FIG. 10 is a flow diagram showing an example in which data is transmitted in a state of extending a channel resource range allocated in a WVAN according to an embodiment of the present invention.

Referring to FIG. 10, a transmitting device transmits data packets to a receiving device using channel resources allocated by a coordinator (S20), and receives an ACK packet for the data packets from the receiving device (S21). This process is repeated in a reserved channel allocated by the coordinator. At this time, data transmission may not be completed in the reserved channel time having a predetermined range or data may be lost during transmission.

For example, if the amount of data packets to be transmitted from the transmitting device to the receiving device may be greater than that expected when the device makes a request for the channel resource allocation to the coordinator or if data loss occurs in the transmission process, data transmission may not be completed in the predetermined reserved channel time.

In the case of data which should be continuously transmitted with a time limit, such as video data, according to one embodiment of the present invention, the transmitting device transmits channel time extension information to the receiving device (S22). The channel time extension information requests the extension of the CTBs which are currently used for data packet transmission, and indicates the extension of the channel resources.

Accordingly, in the present invention, the channel time extension information and the channel resource extension information have the same meaning The transmitting device transmits the channel time extension information to the receiving device in order to transmit the data packets on the CTBs of the unreserved channel time contiguous to the reserved channel time for transmitting the data packets in steps S20 and 21. The receiving device which receives the channel time extension information may hold the power mode at the normal mode not only in the reserved channel time but also in the unreserved channel time, in order to receive the data packets from the transmitting device (S23).

At this time, the receiving device does not hold the power mode at the normal mode according to the request of the transmitting device, and may switch the power mode to the save mode according to the selection of the receiving device.

As the receiving device holds the power mode at the normal mode during some of the unreserved channel time, the transmitting device retransmits the remaining data (S24). Then, the transmitting device receives the ACK packet for the data from the receiving device (S25). According to one embodiment of the present invention, the channel time extension information may be transmitted to the receiving device in a state of being included in a MAC header of data packet transmitted from the transmitting device, which will now be described with reference to FIGS. 11 and 12.

Although a MAC control header data format is described as a transmission format of the channel time extension information, the channel time extension information may be transmitted in a state of being included in another field instead of the MAC header of the data packet or via an independent radio signal.

Figure 11:
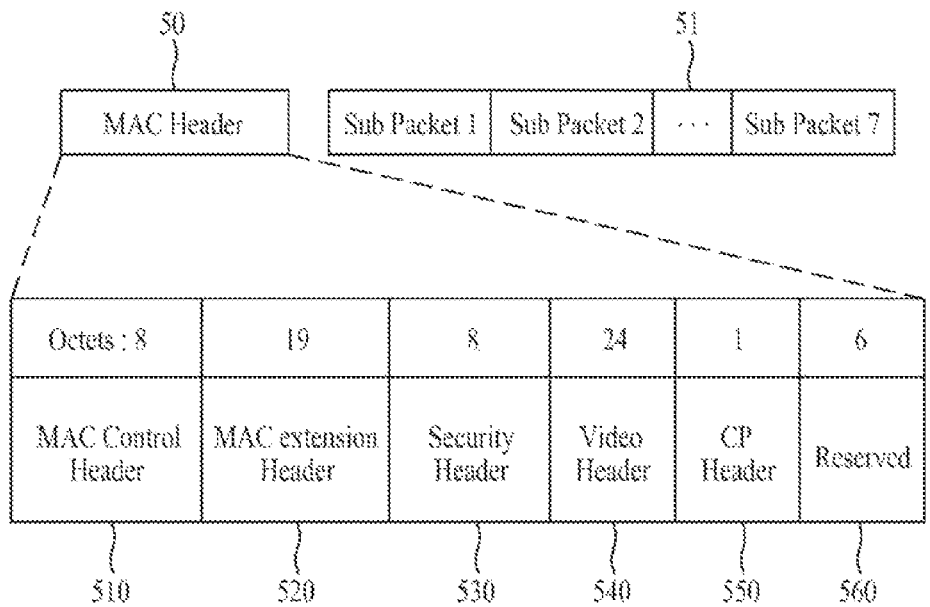
FIG. 11 is a view showing an example of the data format of a Medium Access Control (MAC) header of the WVAN.

FIG. 11 is a view showing an example of the data format of a MAC header of a WVAN.

Referring to FIG. 11, a WVAN data packet includes a MAC header 40 and a packet body field 41 including a plurality of sub-packets. The data packet and the MAC packet have the same meaning The MAC header 40 is subdivided into a MAC control header 410, a MAC extension header 420, a security header 430, a video header 440, a CP header 450, and a reserved channel time 460. The MAC header shown in FIG. 11 is a MAC header included in data transmitted via an HRP channel.

The MAC extension header 420 includes information about a link having a high transfer rate among links used for data transmission, information about an HRP mode and an LRP mode, and one or more ACK groups. The ACK groups correspond to the sub-packets included in the packet body field, respectively.

The security header 430 includes information for identifying a key used for authentication or encryption of data transmitted via the packet. The CP header 450 is used to transfer content protection information of the packet, and the format of the CP header may be variously implemented according to a content protection method used in the data.

Figure 12:
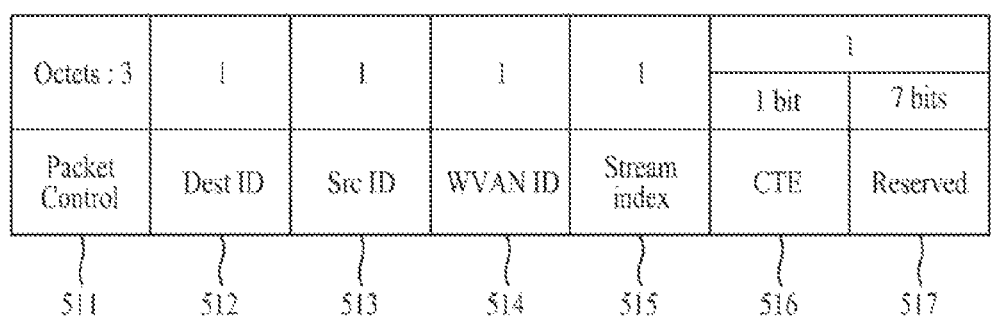
FIG. 12 is a view showing an example of the data format of a MAC control header according to an embodiment of the present invention.

The channel time extension information according to one embodiment of the present invention may be included in the MAC control header 410, which will now be described with respect to FIG. 12. FIG. 12 is a view showing an example of the data format of a MAC control header according to an embodiment of the present invention.

Referring to FIG. 12, an example of the MAC control header 410 includes a packet control field 411, a DestID 412 for setting the ID of the transmitting device which will transmit A/V data in a WVAN, a SrcID field 413 for setting the ID of the receiving device which will receive the transmitted A/V data, a WVAN ID field 414 for identifying a WVAN network including the devices, a stream index field 415, and a reserved channel time 417. If the transmitting device needs to extend transmissions past the current CTBs according to one embodiment of the present invention, a portion of the reserved channel time 417 included in the MAC control header is defined as a Channel Time Extension (CTE) field 416 with respect to any one of a plurality of data packets transmitted via the CTBs of the reserved channel time so as to include the channel time extension information.

If 1 bit is allocated to the CTE field, the channel time extension information may be indicated by zero or one. For example, if it sets CTE bit to one in the CTE field on the MAC control header in the packets it sends before the end of that CTB, it is indicated that the CTBs which are currently used by the transmitting device are extended to a portion of the unreserved channel time. And, if the transmitting device does not require an further extension, it shall set CTE bit to zero in the CTE field in the packets that it sends.

In order to enable the transmitting device to use the CTB of the unreserved channel time subsequent to the reserved channel time, the channel time extension information should be transmitted before the reserved channel time is finished. Accordingly, if the CTE bit of the CTE field of the MAC packet received by the receiving device is set to one, the receiving device may hold the power mode of the receiving device at the normal mode. And, the receiving device may continue to listen for packets or beam searching during the following unreserved CTB until it receives a packet with the CTE bit set to zero.

As the receiving device holds the power mode at the normal mode during a predetermined period even in the unreserved channel time, the transmitting device may transmit data or perform a beam searching process in the corresponding period. Even when the receiving device receives the channel time extension information in which the CTE bit of the CTE field is set to one from the transmitting device, the power mode may be switched to the save mode according to the selection of the receiving device.

The channel time extension information for CTB extension may be used by switching the CTE bit set to one and zero in the CTE field with each other. Alternatively, two bits or more may be allocated to the CTE field. In this case, more detailed channel time extension information may be transmitted.

Figure 13:
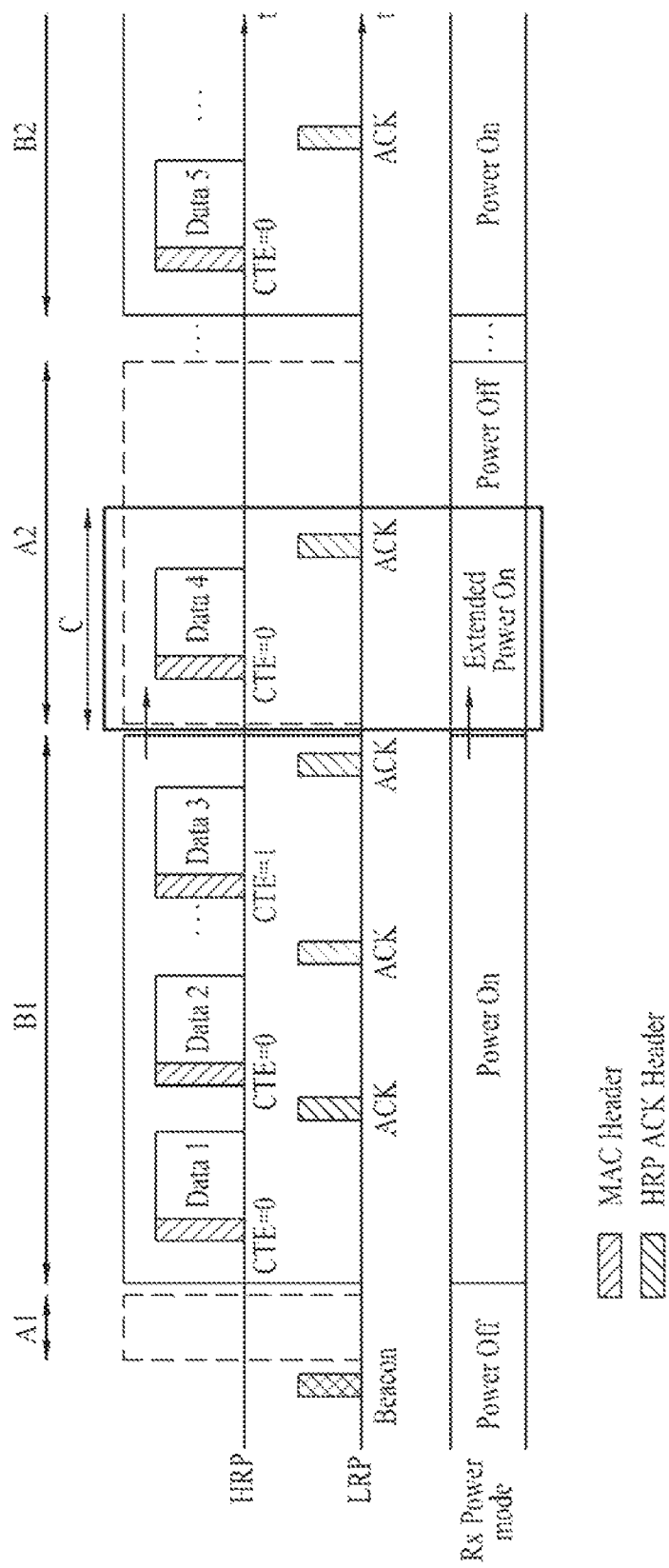
FIG. 13 is a view showing an example of a superframe structure in a WVAN according to an embodiment of the present invention.
Figure 14:
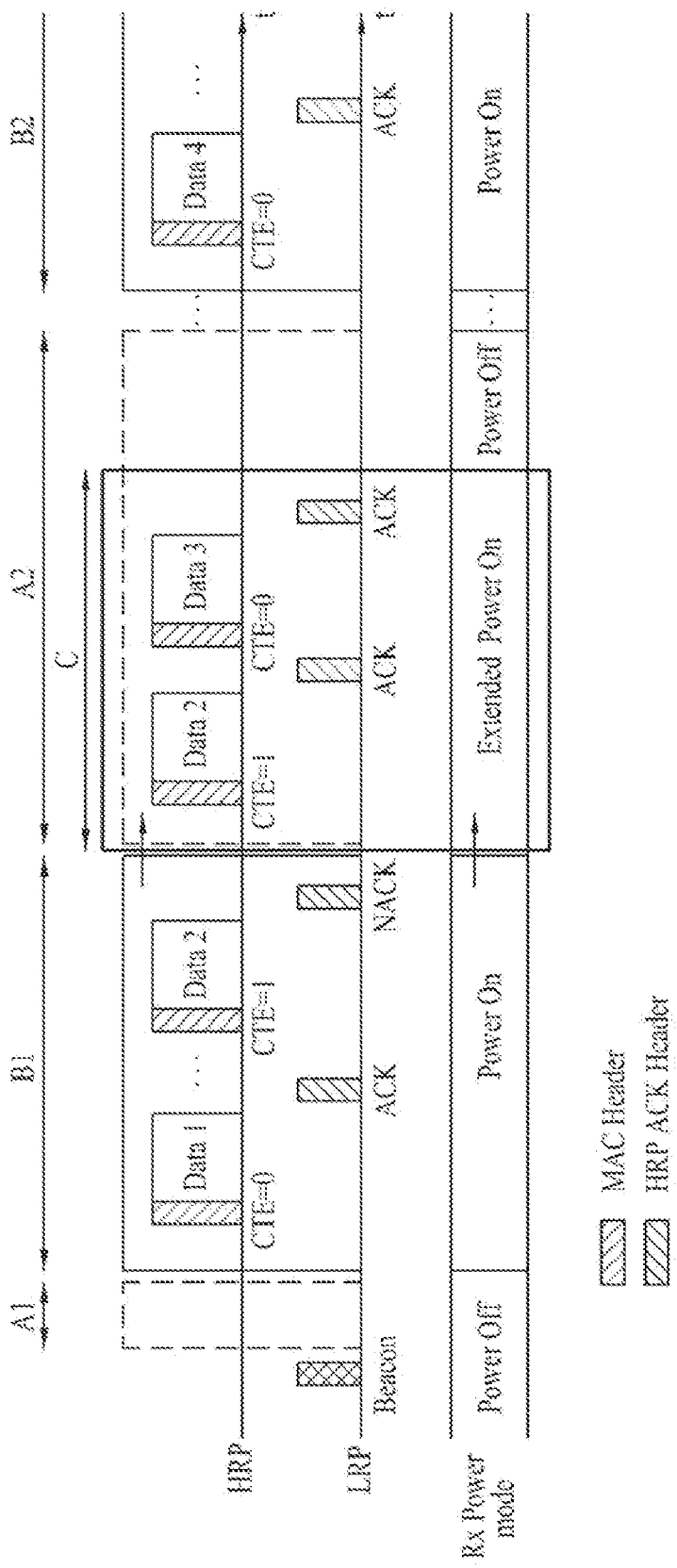
FIG. 14 is a view showing another example of a superframe structure in a WVAN according to an embodiment of the present invention.
Figure 15:
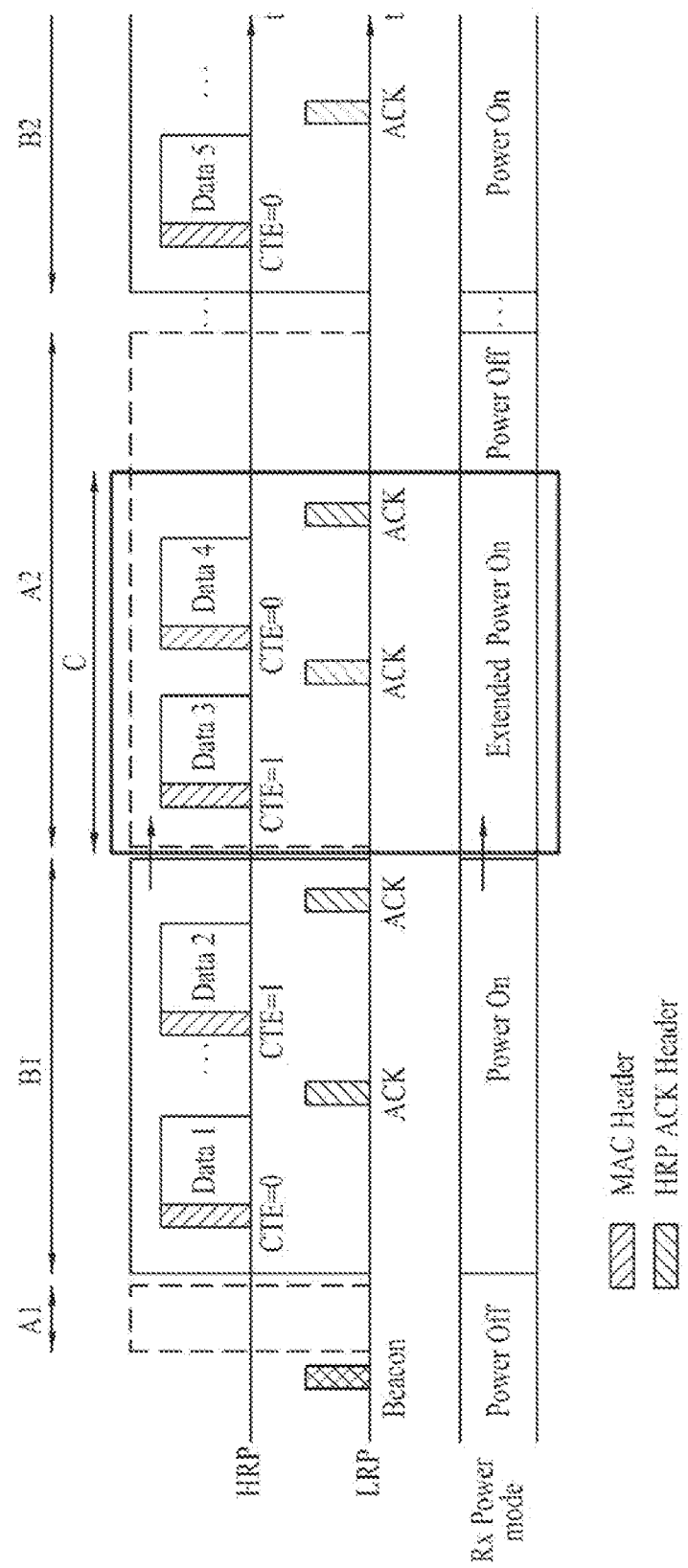
FIG. 15 is a view showing another example of a superframe structure in a WVAN according to an embodiment of the present invention.

FIGS. 13 to 15 are views showing examples of a superframe structure in a WVAN according to an embodiment of the present invention.

Referring to FIG. 13, when a transmitting device transmits one or more data packets to a receiving device via an HRP channel in a reserved channel time, the receiving device transmits an ACK packet for the received data packets via an LRP channel. At this time, if there is a data packet Data4 which is not transmitted by the transmitting device via the CTBs included in a first reserved channel time $B_1$, a CTE bit set to one is transmitted in a state of being included in the CTE field of the MAC control header of a last data packet Data3 transmitted in the reserved channel time $B_1$. The receiving device which receives the data packet Data3 holds the power mode at the normal mode even in the channel resource period set to the unreserved channel time. Therefore, the transmitting device may transmit the data packet Data4 using the CTBs of the unreserved channel time.

Next, when the transmitting device has no more data to send and it sets a CTE bit of the transmitted data packet Data4 is set to zero. The CTE bit set to zero indicates that the transmitting device no longer uses the CTBs of the unreserved channel time. Therefore, the receiving device holds the normal mode until a period C for transmitting the ACK packet is reached. In the subsequent unreserved channel time, the power mode of the receiving device may be switched to the save mode or sleep state, and the transmitting device transmits the remaining data packets via the CTBs of the next reserved channel time $B_2$.

FIG. 14 is a view showing another example of a superframe structure in a WVAN according to the embodiment of the present invention.

Referring to FIG. 14, if the transmitting device transmits a CTE bit set to one in the MAC control header of the last data packet Data2 using the CTBs of the reserved channel time $B_1$, the receiving device holds the power mode at the normal mode such that the transmitting device may use the CTBs of the unreserved channel time.

At this time, if some of the data packets are lost or an error occurs in the transmission process and the NACK signal is transmitted, the transmitting device may retransmit the same data packets via the extended channel resource period in the unreserved channel time or transmit a next data packet in a state in which the data packets are lost. In FIG. 14, the transmitting device which receives the NACK signal retransmits the same data Data2.

At this time, since the CTE bit included in the data packet Data2 is set to one, the receiving device holds the power mode at the normal mode and the transmitting device transmits a next data packet Data3. At this time, if a CTE bit included in the data packet Data3 is set to zero, it is indicated that the transmitting device no longer uses the CTBs of the unreserved channel time. Therefore, the receiving device is switched to the save mode or sleep state in a subsequent unreserved channel time.

Accordingly, the CTBs used by the transmitting device are extended by the period C. FIG. 15 is a view showing another example of a superframe structure in a WVAN according to the embodiment of the present invention.

Similar to the above-described embodiments, even in FIG. 15, the transmitting device may set a CTE bit included in the last data packet Data2 transmitted in the reserved channel time to one and inform the receiving device of the use of the CTBs included in the unreserved channel time. A CTE bit may also be included in the data packet Data3 transmitted in the unreserved channel time.

The receiving device receives the CTE bit channel time extension time set to one and holds the power mode at the normal mode in the CTBs in which the data packet transmission is performed. At this time, the transmitting device may perform a beam searching operation in the CTBs of the unreserved channel time in the normal mode. If the transmitter does not require an further extension, it shall set the CTE bit to zero in the packets that it sends. If the receiving device receives a packet with the CTE bit set to zero during unreserved channel time, it is no longer required to listen for packets and may switch to sleep state. And, the receiving device switches the power mode to the save mode in the remaining unreserved channel time.

In the embodiments described with reference to FIGS. 13 to 15, if the receiving device receives the channel time extension information but switches the power mode to the save mode, the transmitting device may transmit data packets using the CTBs of a next reserved channel time $B_2$ and attempt to extend the range of the CTBs of the next unreserved channel time $A_3$. Next, in association with the use of the unreserved channel time of the WVAN superframe according to another embodiment of the present invention, a method for, at a receiving device, transmitting a response message for channel time extension information will be described with reference to FIG. 16.

Figure 16:
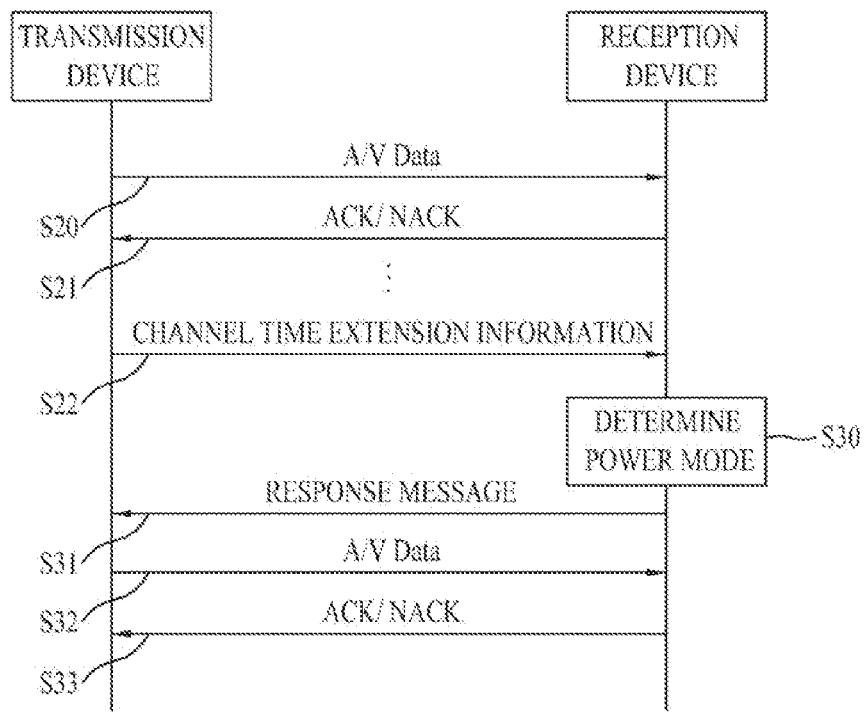
FIG. 16 is a flow diagram showing an example in which data is transmitted in a state of extending an allocated channel resource range in a WVAN according to another embodiment of the present invention.

FIG. 16 is a flow diagram showing an example in which data is transmitted in a state of extending a channel resource range allocated in a WVAN according to another embodiment of the present invention.

Referring to FIG. 16, steps (S20 and 22) of, at a transmitting device, transmitting channel time extension time while transmitting A/V data to a receiving device via a reserved channel time of a WVAN superframe using channel resources allocated by a coordinator are equal to those shown in FIG. 10.

According to another embodiment of the present invention, the receiving device which receives the channel time extension information for extension of CTBs, which are currently used, from the transmitting device determines whether the power mode is adjusted according to the received information (S30). If the receiving device determines that the normal mode is held or switched to the save mode according to the state of the receiving device, a response message is generated based on the determination.

The generated response message is transmitted to the transmitting device (S31). Thereafter, step S32 of transmitting data from the transmitting device to the receiving device may be performed via the unreserved channel time if the response message indicating that the power mode is held at the normal mode according to the channel time extension information is received from the receiving device. In contrast, if the response message indicating that the power mode is switched to the save mode is received from the receiving device, the transmitting device transmits the data via a next reserved channel time.

Figure 17:
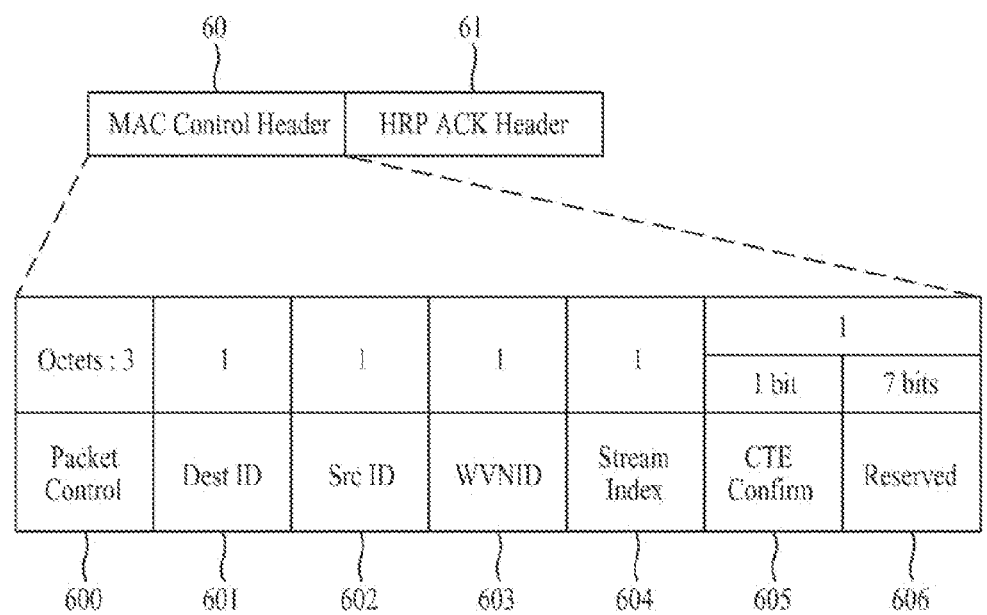
FIG. 17 is a view showing an example of an HRP ACK packet data format according to another embodiment of the present invention.

The response message may be included in the ACK packet transmitted from the receiving device to the transmitting device, which will be described with reference to FIG. 17. FIG. 17 is a view showing an example of a data packet for transmitting a response message according to channel time extension information according to another embodiment of the present invention.

In general, data transmission/reception between devices in a WVAN is performed via an HRP channel and transmission/reception of a beacon or an ACK packet is performed via an LRP channel.

According to another embodiment of the present invention, a receiving device may transmit the ACK packet on the HRP channel or transmit an HRP ACK packet as shown in FIG. 17. The HRP ACK packet transmitted by the receiving device which receives a data packet from a transmitting device includes a MAC control header field 50 and an HRP ACK header field 51.

An example of the MAC control header 50 includes a packet control field 501, a DestID field 502 for setting the ID of the receiving device which will transmit the ACK packet in the WVAN, a SrcID field 503 for setting the ID of the transmitting device which receives the transmitted ACK packet, a WVNID field 504 for identifying a WVAN network including the devices, a stream index field 505 and a reserved channel time 507 for transmitting the remaining data or the like.

The receiving device which determines whether or not channel time extension is performed according to the channel time extension information transmitted by the transmitting device may allocate a portion of the reserved field 507 as a "CTE confirm (CTEC)" field 506 for transmitting the response information according to the channel time extension information. The CTEC field is used for convenience of description, and a field for transmitting the response information according to the channel time extension information may be represented by another term.

If 1 bit is allocated to the CTEC field, it may be indicated whether the channel resource extension to the unreserved field is determined by the receiving device, using zero or one. For example, if a CTEC bit corresponding to the CTEC field is set to one, it is indicated that the receiving device holds the power mode at the normal mode and prepares data reception according to the channel time extension information.

In contrast, if a CTEC bit corresponding to the CTEC field is set to zero, it is indicated that the channel resource range is not extended and the receiving device switches the power mode to the save mode after transmitting the ACK signal.

Conversely to the above example, if a CTEC bit is set to one, it may be indicated that the power mode is switched to the save mode and, if a CTEC bit is set to zero, it may be indicated that the normal mode is held. In addition, if more bits are allocated to the CTEC field, the response format of the receiving device becomes variable and, if the channel resource extension request of the transmitting device is rejected, the reason for rejection may be indicated.

If the receiving device transmits the determination as to whether or not channel time extension is performed according to the channel time extension information to the transmitting device as the response, the transmitting device may prepare data transmission via a next reserved field without repeating the same request.

Figure 18:
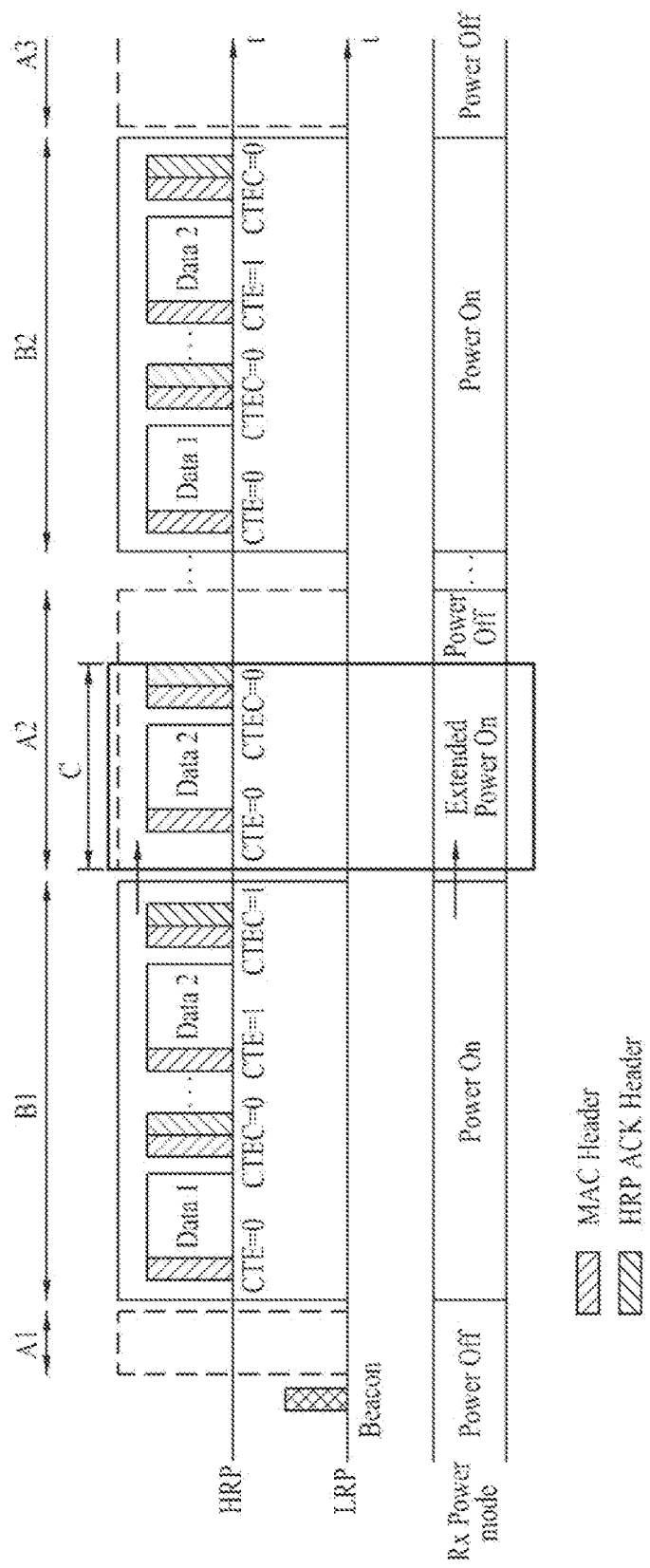
FIG. 18 is a view showing an example of a superframe structure in a WVAN according to another embodiment of the present invention.

FIG. 18 is a view showing an example of a superframe structure in a WVAN according to another embodiment of the present invention.

Referring to FIG. 18, a receiving device may transmit an acceptance or rejection response message is included in an HRP ACK signal via an HRP channel in response to channel time extension information (CTE bit set to one) transmitted from a transmitting device.

If the transmitting device includes and transmits the channel time extension information (CTE bit set to one) in a MAC header of a last data packet Data2 via CTBs of a reserved channel time $B_1$ and the receiving device adjusts the power mode according to the channel time extension time, the receiving device transmits an ACK packet with a CTEC bit set to one. The CTEC bit is included in a MAC header of the ACK signal for the transmitted data packet Data2. The CTEC bit set to one indicates that the power mode of the reception mode is held at the normal mode according to the channel time extension information of the transmitting device.

Accordingly, the transmitting device may extend the channel resources up to some CTBs (period C) of the unreserved channel time and transmit a data packet Data3.

Meanwhile, if the receiving device does not follow the channel information extension information, referring to FIG. 18, when CTE bit of a MAC header of a last data packet Data5 is set to one and is transmitted in the reserved channel time $B_2$, the receiving device may set CTEC bit included in the MAC header of an ACK packet for the transmitted data packet Data5 to zero and transmit the response message.

That is, the response message indicating that the power mode of the receiving device is switched to the save mode while the unreserved channel time is started is transmitted. The response message transmitted from the receiving device to the transmitting device may be transmitted in a state of being included in the ACK packet via the LRP channel. Even in this case, the response message may be transmitted in a state of being included in the MAC control header of an omni ACK packet via the LRP channel. The data format of the MAC control header is equal to the data format described with reference to FIG. 17 and the description thereof will be omitted. The response message is not transmitted via only the ACK packet, but may be transmitted via another signal or may be transmitted in a state of being included in another field of the ACK packet. When the receiving device transmits a separate response message to the transmitting device, the transmitting device can accurately confirm the power mode of the receiving device so as to reduce an error occurrence rate.

Figure 19:
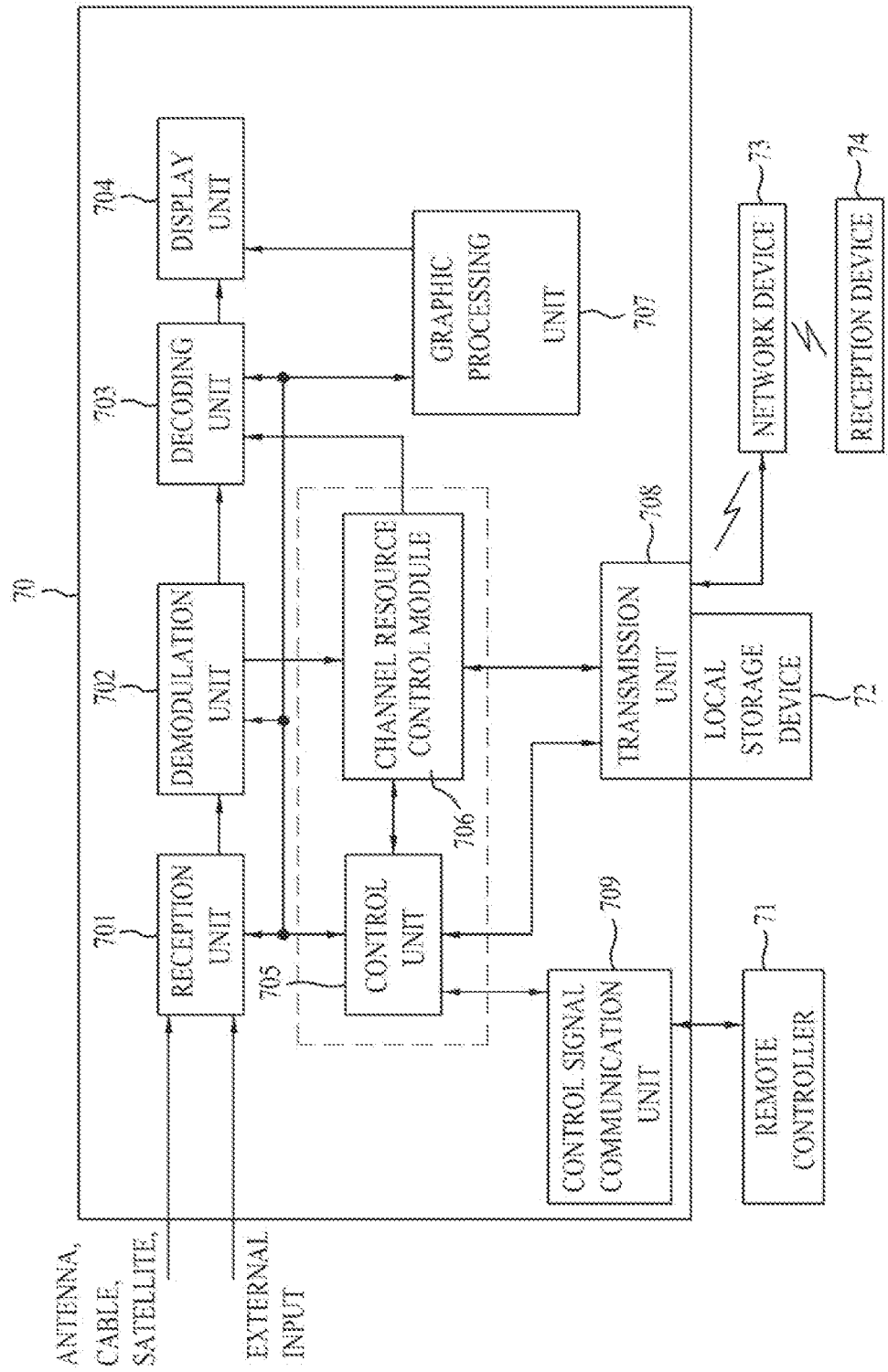
FIG. 19 is a view showing an example of a broadcast signal processing system including a device of a WVAN according to an embodiment of the present invention.

FIG. 19 is a view showing an example of a broadcast signal processing system including a device of a WVAN according to an embodiment of the present invention.

The device of the wireless network may reproduce A/V data received from a broadcast station or a cable satellite via an antenna by performing the below-described process. In addition, if the device operates as a source device or a transmitting device on the wireless network, the device may remotely transmit the received data packets to one or more sync devices or receiving devices.

Referring to FIG. 19, the broadcast signal processing system including the WVAN transmitting device according to the embodiment of the present invention includes a transmitting device 70, a remote controller 71, a local storage device 72, a receiving device 74, and a network device 73 for performing wireless communication.

The transmitting device 70 which transmits data packets may include a reception unit 701, a demodulation unit 702, a decoding unit 703, a display unit 704, a control unit 705, a channel resource control module 706, a graphic processing unit 707, a transmission unit 708, and a control signal communication unit 709. In the example of FIG. 19, the transmitting device further includes a local storage device 72. Although an example in which the local storage device 72 is directly connected to the transmission unit 708 including an input/output port is disclosed, the local storage device may be a storage device mounted in the transmitting device 70. The transmission unit 708 may communicate with the wired/wireless network device 73, and may be connected to at least one receiving device 74 present on the wireless network via the network device 73. The control signal communication unit 709 may receive a user control signal and output the received signal to the control unit 705 according to a user control device such as the remote controller.

The reception unit 701 may be a tuner which receives a broadcast signal having a specific frequency via at least one of a terrestrial wave, a satellite, a cable and the Internet. The reception unit 701 may be individually included according to broadcast sources, e.g., a terrestrial wave, a cable, a satellite and a personal broadcast, or may be mounted as an integrated tuner. If it is assumed that the reception unit 701 is a terrestrial broadcast tuner, one or more digital tuners and analog tuners may be included or an integrated digital/analog tuner may be included.

The reception unit 701 may receive Internet Protocol (IP) streams on wired/wireless communication. If the IP streams are received, the reception unit 701 may process transmitted/received packets according to an IP protocol for setting source and destination information with respect to packets transmitted by the receiver and the received IP packets.

The reception unit 701 may output video/audio/data streams included in the received IP packets according to the IP protocol and generate and output the transport streams to be transmitted over the network by the IP packets according to the IP protocol. The reception unit 701 receives an external image signal and, for example, may receive an external video/audio signal in IEEE 1394 format or external streams in HDMI format.

According to the embodiment of the present invention, if the transmitting device transmits channel time extension information to the receiving device, the transmitting device may receive a response message for the channel time extension information from the receiving device via the reception unit 701. The demodulation unit 702 demodulates the broadcast signal of the data received via the reception unit 701 or the broadcast signal transmitted by the receiving device using an inverse method of a modulation method. The demodulation unit 702 demodulates the broadcast signal and outputs broadcast streams. If the reception unit 701 receives the stream-type signal, e.g., IP streams, the IP streams bypass the demodulation unit 702 to be output to the decoding unit 703. The decoding unit 703 includes an audio decoder and a video decoder, and decodes the broadcast streams output from the demodulation unit 702 using a decoding algorithm and outputs the decoded streams to the display unit 704. At this time, a demultiplexer (not shown) for dividing the streams according to identifiers may be further included between the demodulation unit 702 and the decoding unit 703.

The demultiplexer may divide audio element streams (ESs) and video Ess and output the ESs to the respective decoders of the decoding unit 703. In addition, if a plurality of programs is multiplexed in one channel, only a broadcast signal of a program selected by a user may be selected and divided into video ESs and audio ESs. If data streams or system information streams are included in the demodulated broadcast signal, they are divided by the demultiplexer so as to be transferred to respective decoding blocks (not shown). The display unit 704 may display broadcast content received by the reception unit 701 or content stored in the local storage device 72. A menu for displaying information indicating whether a storage device is mounted or information associated with residual storage capacity may be displayed according to a control command of the controller 705 and may be operated according to the control of the user.

The control unit 705 may control the operations of the components (the reception unit, the demodulation unit, the decoding unit, the display unit, the graphic processing unit, the network control module, and the interface unit). A menu for receiving the control command of the user may be displayed and an application for displaying a variety of information or a menu of the broadcast signal processing system to the user may be driven.

For example, if the local storage device 72 is mounted, the control unit 705 may read content stored in the local storage device 72. If the local storage device 72 is mounted, the control unit 705 may control broadcast content received by the reception unit 701 to be stored in the local storage device 72. The control unit 705 may output a signal for controlling the local storage device 72 to be mounted, depending on whether the local storage device 72 is mounted.

The control unit 705 checks the residual storage capacity of the local storage device 72 and controls the information about the residual storage capacity to be displayed to the user on the display unit 704 via the graphic processing unit 707. If the residual storage capacity is insufficient, the control unit 705 may transfer and store the content stored in the local storage device 72 to and in a remote storage device or the like.

In this case, if the residual storage capacity of the local storage device 72 is insufficient, the control unit 705 may display a menu for indicating whether the content stored in the local storage device 72 is transferred to and stored in another local storage device (not shown), the remote storage device or the like to the user on the display nit 704.

In addition, the control unit may receive and process the control signal of the user. Accordingly, the control unit 705 may transfer the content stored in the local storage device 72 and the storage device, which is directly or remotely mounted, to each other.

The channel resource control module 706 controls the transmitting device to accept the channel resources allocated by the coordinator in order to transmit data to the receiving device and controls the channel resources to be extended up to a portion of the unreserved channel time. An example of the channel resources includes a channel time, and the reserved channel time and the unreserved channel time include one or more CTBs.

In general, the transmitting device may transmit data or the like to another device in the reserved channel time of the channel resources allocated by the coordinator and may use a corresponding period according to the contention-based method between devices in the unreserved channel time. Accordingly, the channel resource control module according to one embodiment of the present invention controls channel time extension information to be generated and transmitted to the receiving device, if data is desired to be transmitted via the unreserved channel time.

Accordingly, instead of the contention-based method between devices, the unreserved channel time may be used as the use period of a specific device.

Meanwhile, the channel resource control method performed by the channel resource control module 706 may be performed by the control unit 705. If the channel resource control module 706 generates and transmits the channel time extension information to the receiving device via the transmission unit and the receiving device adjusts the power mode according to the channel time extension information, the control unit 705 may control the data to be transmitted via the extended channel resources.

Although the control unit 705 and the channel resource control module 706 are separately included for convenience of description in FIG. 19, they may be implemented by one system chip as denoted by a dotted line.

The graphic processing unit 707 may process the graphics to be displayed such that a video image displayed by the display unit 704 is displayed on a menu screen so as to display the graphics on the display unit 704. The transmission unit 708 may transmit data to at least one receiving device 74 over the wired/wireless network and may include an interface unit such that bidirectional communication between devices is performed. If the coordinator allocates the channel resources, the transmitting device transmits data or the like to the receiving device via the transmission unit 708 within the allocated channel resource range.

The interface unit may interface with at least one second device 74 over the wired/wireless network and examples thereof include an Ethernet module, a Bluetooth module, a local area wireless Internet module, a mobile Internet module, a home phone line networking alliance (HomePNA) module, an IEEE1394 module, a programmable logic control (PLC) module, a home radio frequency (RF) module, an infrared data association (IrDA) module, etc.

Meanwhile, the transmission unit 708 may output a control signal for turning on the power source of the remote storage device. For example, although not shown in FIG. 19, the transmission unit 708 may transmit a WOL signal to the network interface unit communicating with a separate remote storage device and turn on the power source of the remote storage device.

The above-described terms may be replaced with other terms. For example, the term "device" may be replaced with the term "user equipment (or device)", "station", etc., and the term "coordinator" may be replaced with the term "coordination (or control) apparatus", "coordination (or control) device", "coordination (or control) station", "coordinator", or "Piconet Coordinator (PNC)". The device which accepts channel resources having a predetermined range, which are allocated by the coordinator, and transmits data to another device may be replaced with the term "originator" or "transmitting device" from a relationship with a device for receiving the data. The device for receiving the data may be replaced with the term "target" or "receiving device" from a relationship with the device for transmitting the data. The term "data packet" may be replaced with the term "data block" or "data unit".

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

The present invention can be applied to a wireless communication system and a wireless HD system. The present invention provides embodiments of a method of exchanging messages and transmitting and receiving device.

The invention claimed is:

1. A method for transmitting data in a transmitting device of a wireless network which comprises at least the transmitting device, a receiving device, and a coordinator, the method comprising:

transmitting a plurality of data packets to the receiving device during a reserved channel time allocated by the coordinator, each of the plurality of data packet comprising a header, wherein each header of the plurality of data packets comprises a channel time extension (CTE) field, and wherein a CTE field of a last data packet among the plurality of data packets is set to a value to inform the receiving device whether or not the transmitting device will continue to transmit a data packet to the receiving device during an unreserved channel time, and wherein CTE fields of data packets other than the last packet among the plurality of data packets are set to "0"; and transmitting a data packet to the receiving device during the unreserved channel time if the CTE field of the last data packet is set to "1".

2. The method of claim 1, wherein the unreserved channel time is a channel time which is not allocated to any devices by the coordinator.

3. The method of claim 1, wherein the reserved or unreserved channel time comprises at least one channel time block.

4. The method of claim 1, wherein the transmitting device sets a CTE field of the data packet transmitted during the unreserved channel time with the specific value to inform the receiving device that the transmitting device will continue to transmit a data packet to the receiving side during the unreserved channel time.

5. The method of claim 1, wherein the data packet transmitted during the unreserved channel time has a header comprising a CTE field to indicate whether the transmitting device continues to transmit a data packet during the unreserved channel time.

6. An apparatus for transmitting data in a wireless network, the apparatus comprising:

a transmission unit for transmitting a plurality of data packets to a receiving device during a reserved channel time allocated by a coordinator, each of the plurality of data packets comprising a header, wherein each header of the plurality of data packets comprises a channel time extension (CTE) field; and a channel resource control module for setting a CTE field of a last data packet among the plurality of data packets to a value to inform the receiving device whether or not the transmission unit will continue to transmit a data packet to the receiving device during an unreserved channel time, and wherein CTE fields of data packets other than the last packet among the plurality of data packets are set to "0", wherein the transmission unit transmits a data packet to the receiving device during the unreserved channel time if the CTE field of the last data packet is set to "1".

7. The apparatus of claim 6, wherein the transmission unit transmits a data packet to the receiving device during the unreserved channel time.

8. The apparatus of claim 7, wherein the channel resource control module sets a CTE filed of the data packet transmitted during the unreserved channel time to "1" to inform the receiving device that a data packet continues to be transmitted to the receiving device during the unreserved channel time.

9. The apparatus of claim 7, wherein the data packet transmitted during the unreserved channel time has a header comprising a CTE field to indicate whether a data packet continues to be transmitted to the receiving device during the unreserved channel time.

10. The apparatus of claim 6, wherein the unreserved channel time is a channel time which is not allocated to any devices by a coordinator.

11. The apparatus of claim 6, wherein the reserved or unreserved channel time comprises at least one channel time block.

* * * * *